S. N. & W. F. Stillman.
Garden Rake.
Nº 12,396. Patented Feb. 13, 1855.

UNITED STATES PATENT OFFICE.

S. N. STILLMAN AND W. F. STILLMAN, OF LEONARDSVILLE, NEW YORK.

IMPROVEMENT IN GARDEN-RAKES.

Specification forming part of Letters Patent No. 12,396, dated February 13, 1855.

*To all whom it may concern:*

Be it known that we, S. N. STILLMAN and W. F. STILLMAN, of Leonardsville, in the county of Madison and State of New York, have invented a new and useful Improvement in the Construction of Garden-Rakes; and we do hereby declare that the following is a full, clear, and exact description of the same, reference being had to the annexed drawings, making a part of this specification, in which—

Figure 1:
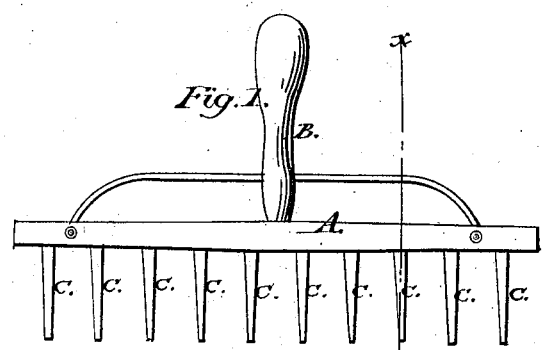
Figure 2:
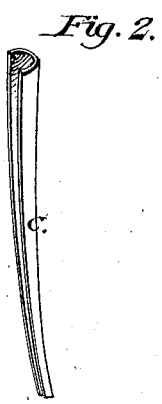
Figure 3:
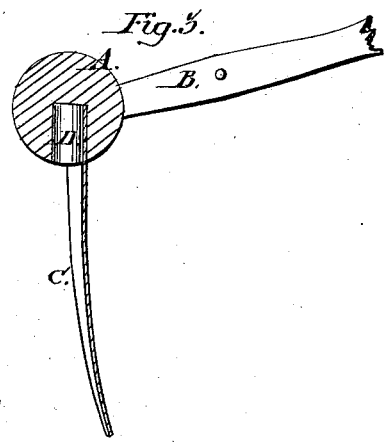
Figure 4:
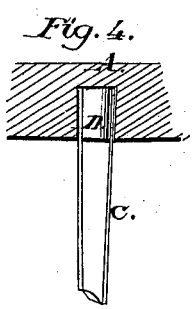

Figure 1 is a front view of our improved rake. Fig. 2 is a detached perspective view of a tooth of the same. Fig. 3 is a transverse vertical section of the same, X X, Fig. 1 showing the plane of section. Fig. 4 is a longitudinal section of a portion of the rake-head. A portion of one rake-tooth is shown.

Similar letters of reference indicate corresponding parts in the several figures.

The nature of our invention consists in having the rake-teeth of peculiar form and securing them in the rake-head by means of wedges, as will be hereinafter shown and described.

To enable others skilled in the art to fully understand and construct our invention, we will proceed to describe it.

A represents the rake-head, constructed of wood.

B is the handle, attached to the head A in the usual manner.

C are the teeth, formed of cast-steel. The construction of the teeth will be understood by referring to Fig. 2. It will be seen that they are curved lengthwise in the usual manner, and transversely they are nearly of semicircular shape, each tooth resembling the half of a conical tube bisected longitudinally through its center; or the teeth may be described as being formed of flat taper steel plates, curved longitudinally in proper form, and then bent so that a transverse section will be or approximate to a semicircular form. The teeth C are secured in the head A of the rake in the following manner: Circular holes are bored in the rake-head A on its under side about two-thirds the way through, leaving one-third to prevent the teeth from being forced up through the head, and at the required distance apart, the larger ends of the teeth are inserted in these holes, and circular wedges D are then dipped in glue and driven in the holes, as shown in Figs. 3 and 4, and the teeth permanently secured to the head A.

By the above arrangement we produce an implement of light weight and great strength, and also an economical article, as they can be manufactured cheaply.

What we claim as our invention, and desire to secure by Letters Patent, is—

The new manufacture of garden-rake decribed—viz., a rake having curved metal teeth inserted and fastened into the head, as set forth.

SAMUEL N. STILLMAN.
WM. F. STILLMAN.

In presence of—
THOMAS HOXIE,
M. W. ST. JOHN.